June 6, 1950 W. F. DOUBLE ET AL 2,510,172
TANDEM AXLE CONSTRUCTION
Filed Feb. 6, 1947 2 Sheets-Sheet 1

INVENTORS
WALTER F. DOUBLE
STEWART F. ARMINGTON
RAYMOND Q. ARMINGTON
By Hyde, Meyer, Baldwin & Doran
ATTORNEYS June 6, 1950  W. F. DOUBLE ET AL  2,510,172
TANDEM AXLE CONSTRUCTION
Filed Feb. 6, 1947  2 Sheets-Sheet 2

INVENTORS
WALTER F. DOUBLE
STEWART F. ARMINGTON
RAYMOND Q. ARMINGTON
By Hyde, Meyer, Baldwin & Doran
ATTORNEYS Patented June 6, 1950

2,510,172

UNITED STATES PATENT OFFICE 2,510,172

TANDEM AXLE CONSTRUCTION

Walter F. Double, Wickliffe, Stewart F. Armington, Willoughby, and Raymond Q. Armington, Shaker Heights, Ohio, assignors to The Euclid Road Machinery Company, Cleveland, Ohio, a corporation of Ohio Application February 6, 1947, Serial No. 726,872

4 Claims. (Cl. 280—104.5)

This invention relates to improvements in a tandem axle construction and more particularly to improved means for supporting a vehicle upon tandem axles in a manner to permit the necessary relative motion between the axles and the vehicle.

One of the objects of the present invention is to provide novel support means between tandem axles and a vehicle, utilizing a resilient body, such as rubber, for permitting relative motion between the axle and the vehicle body. The present invention utilizes the resilient body to support substantially vertical loads and to resist relative lateral movement between the axles and the frame.

Other objects and advantages of the present invention will be apparent from the accompanying drawings and specification and the essential features thereof will be set forth in the appended claims.

In the drawings:

Fig. 2 is a fragmental sectional view taken along the line 2—2 of Fig. 1; while

The present invention is directed to the problem of supporting heavy vehicles requiring a plurality of axles and a plurality of wheels for supporting heavy loads. Various constructions have been utilized to provide tandem axles for supporting a vehicle and to provide means permitting relative movement between the axles and the vehicle. The present invention utilizes resilient deformable bodies such as rubber for supporting the vertical load of the vehicle, for permitting tilting of the axles sidewise and for controlling the tendency of the axles to move laterally relative to the vehicle frame. Other means is provided for resisting driving torque and braking loads.

Figure 3:
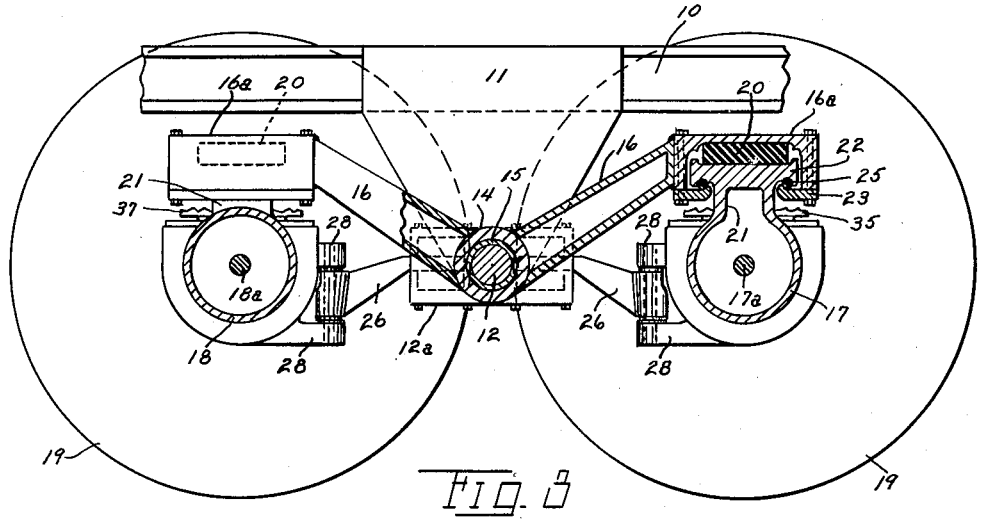
Figs. 3 and 4 are sectional views taken along similarly numbered lines of Fig. 1.
Figure 4:
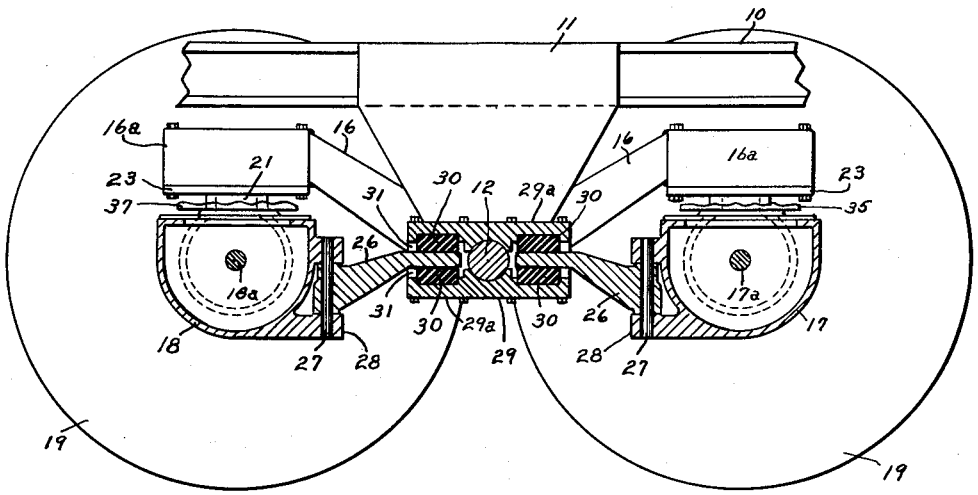

In the drawings, a portion of the vehicle frame is indicated by the parallel I-beams 10. The rest of the vehicle body has been omitted from the drawings for clearness in description. Extending downwardly from each beam 10 is a pair of bracket plates 11 which support a pivot shaft 12 in fixed relationship to the frame 10. Oscillatably mounted on opposite ends of the pivot shaft are rocker beams 13a and 13b. These are alike except that one is right- and the other is left-hand. Each beam has a central hub 14 provided with a suitable bearing 15 between the hub and shaft 12. Each rocker beam has arms 16 extending forwardly and rearwardly from the hub to positions over the axle units. As shown in Figs. 3 and 4, these arms diverge upwardly from the hub in the present embodiment. Forward and rearward axle housings 17 and 18 respectively support drive wheels 19. The forward and rearward axle housings enclose drive axles 17a and 18a respectively, which are driven in a manner presently described, so as to rotate wheels 19.

Figure 2:
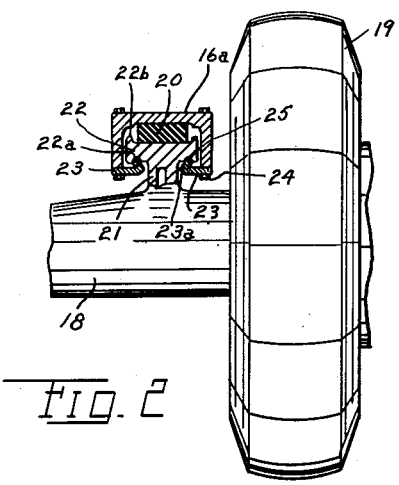

Each arm 16 has a cap 16a of generally rectangular shape which overlies the adjacent axle housing. Resilient deformable bodies 20 of rubber or the like are interposed between the caps 16a of the rocker beams and the axle housings 17 and 18 as best shown in Figs. 2 and 3. Integral with the axle housings, are upwardly extending stems or projections 21 each terminating in an enlarged head 22, there being two of these in each axle housing, or four in all. Each of these heads 22 has a cup-shape upper surface, generally rectangular, upon which rests one of the rubber bodies 20. Each of the caps 16a is open at the bottom and after the parts are assembled, a closing plate 23 is secured by bolts 24 so as to hold the parts assembled as shown in Figs. 2 and 3. Each closing plate 23 is made in two parts so as to permit assembly. A retaining ring 25 of rubber or the like is held between an internal flange 23a of the retaining plate and a retaining groove 22a in the head 22. It will be noted that the resilient bodies 20 are here shown as rectangular in shape, and we find that rubber approximately three inches thick and 8″ x 12″ in width and length gives a suitable support for heavy duty trucks. It will be noted that each body of rubber 20 is held about the periphery by means of the upstanding flange 22b of the head 22 and the cap 16a when one of the axle units tilts relative to the vehicle frame in a plane at right angles to the direction of vehicle motion. For instance, if the wheel 19 of Fig. 2 should rise relative to the wheel on the opposite or left-hand side of the vehicle, the axle housing 18 would be inclined upwardly toward the right as viewed in Fig. 2 and the right-hand portion of the rubber block 20 would be squeezed between the head 22 and the cap 16a. The arrangement of the rubber block 20 and the surrounding parts as shown in Figs. 2 and 3 is likewise designed to resist the tendency of an axle unit to shift sidewise relative to the vehicle frame, as will be later more fully described.

Means is provided to take care of brake and driving torque by means of torque arms 26, one for each axle. Each of these torque arms is pivotally connected with its associated axle housing on a generally vertical pivotal axis. As shown in the various views, a vertical pin 27 passes through the fixed end of the torque arm and through an associated bracket 28 secured to the adjacent axle housing. The free end of each torque arm 26 is secured to the frame in a manner to permit oscillation of the torque arm in a generally vertical plane. The means shown comprises a bracket 29 fixed to the pivot shaft 12 and providing walls 29a above and below the free end of each torque arm and spaced therefrom. A body of resilient deformable material 30 such as rubber or the like is engaged between the free end of each torque arm, there being one body above and one below and held by the walls 29a. It will be noted that freedom of movement is provided at the zones 31 above and below each torque arm and at the zones 32 (Fig. 1) on each side of each torque arm. It results from this construction that each arm 26 resists braking and driving torque loads in a resilient manner due to the rubber blocks 30. At the same time, these blocks 30 do not have any loads due to the tendency of the axle units to shift laterally relative to the frame because the pivot pins 27 permits a free lateral shifting movement insofar as the torque arms are concerned.

The tendency of the axle units to shift laterally relative to the frame, as mentioned in the preceding paragraph, is resisted by the rubber blocks 20. As previously mentioned, each of these rubber blocks is so confined by the flange 22b and the associated cap 16a that when the associated axle unit tends to shift laterally there is a shearing load on the associated rubber blocks 20. We find that these blocks are well able to withstand this shearing stress so that the described construction efficiently resists the tendency of the axle units to move sidewise.

Figure 1:
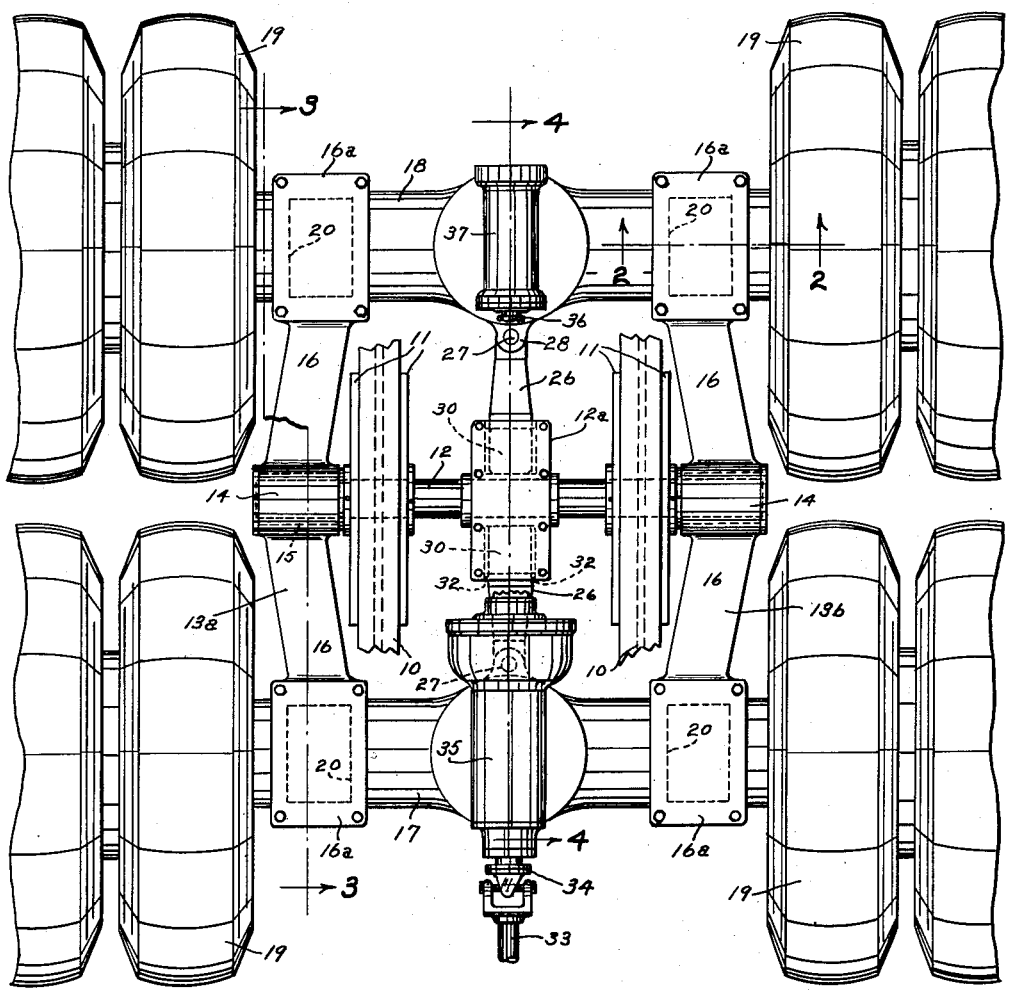
Fig. 1 is a plan view of one embodiment of our invention with the major portion of the vehicle removed so as to more clearly show the axle construction.

Any suitable means may be utilized for rotating the drive shafts 17a and 18a to turn the drive wheels. As here shown the vehicle propeller shaft 33 is connected by universal joint 34 with a worm drive mechanism within the housing 35, which in turn is suitably connected with the axles 17a to turn them. A connecting shaft 36, shown only fragmentally in Fig. 1, provides a driving connection from housing 35 to housing 37. The shaft 36 is provided with a universal joint near each of the housings 35 and 37 as will be well understood by those skilled in this art. Suitable worm drive mechanism within the housing 37 connects with the axles 18a to drive them.

It results from the above construction that as the vehicles is driven over rough ground, if all of the rear wheels are raised or lowered substantially equally relative to the forward wheels, the movement is taken care of by oscillation of the rocker beams 13a and 13b about the pivot shaft 12. If, however, unequal movement occurs between the wheels on opposite sides of the vehicle there is a tilting movement of the axle housings 17 and 18 about the longitudinal center line of the vehicle. Distortion of the resilient bodies 20 is adapted to accommodate all such tilting action without strain on the other parts of the construction. At the same time, these bodies 20 resist any tendency toward sidewise movement of the axle units relative to the vehicle frame.

What we claim is:

1. Tandem axle construction comprising a vehicle frame, a shaft rigidly supported thereon and therebeneath and extending transversely of said frame, parallel rocker beams on opposite sides of said frame, each beam having an intermediate portion oscillatably mounted on said shaft and having arms extending from said shaft in fore-and-aft directions, parallel front and rear axle units on opposite sides of said shaft, each of said axle units having wheel means at opposite sides of said vehicle, connecting means between said axle units and the free ends of said rocker beam arms, a resilient deformable body in each of said connecting means for cushioning relative movement between said axle units and said beams, a torque arm for each axle unit, each torque arm having one end pivotally connected with its associated axle unit about a generally vertical pivotal axis, each torque arm extending toward said shaft, the other end of each toque arm having generally parallel upper and lower surfaces, a bracket mounted on said shaft and providing walls spaced above and below the free end of each torque arm, and a body of resilient deformable material engaged between said upper and lower surfaces of said other end of each torque arm and said walls above and below it respectively.

2. In vehicle construction wherein rocker beams are pivotally connected intermediate their ends to a frame and tandem axle units are carried at the ends of said beams, a connection between one of said beams and its associated axle unit including a resilient member, a torque arm having one end pivotally connected to said axle unit, said torque arm pivotal connection extending in a plane at right angles to the axle, the other end of said arm having generally parallel upper and lower surfaces, and means connected with said frame and holding resilient deformable bodies against said surfaces.

3. The combination of claim 2 wherein said last named means comprises rigid cup shape members above and below said other end of said arm and opening toward said arm, and there being clearance between said arm and said cup shape members in both horizontal and vertical directions.

4. In vehicle construction, wherein an axle housing is connected with a vehicle frame for movement relative to said frame, a torque arm extending from said axle housing longitudinally of said vehicle, one end of said arm having a pivotal connection with said housing, said pivotal connection extending in a plane at right angles to the axle, the other end of said arm having generally parallel upper and lower surfaces, and means connected with said frame and holding resilient deformable bodies against said upper and lower arm surfaces.

WALTER F. DOUBLE.
STEWART F. ARMINGTON.
RAYMOND Q. ARMINGTON.

REFERENCES CITED

The following references are of record in the file of this patent:

UNITED STATES PATENTS

| Number | Name | Date |
|---|---|---|
| 1,699,530 | Gurney | Jan. 22, 1929 |
| 1,912,308 | Rayburn | May 30, 1933 |
| 2,193,567 | Pointer | Mar. 12, 1940 |